United States Patent [19]

Schnars et al.

[11] Patent Number: 4,797,924
[45] Date of Patent: Jan. 10, 1989

[54] VEHICLE VOICE RECOGNITION METHOD AND APPARATUS

[75] Inventors: Michael J. Schnars, Haslett; Darrel A. Dolph, Big Rapids, both of Mich.; Yu-Jih Liu, Wharton, N.J.

[73] Assignee: Nartron Corporation, Reed City, Mich.

[21] Appl. No.: 791,373

[22] Filed: Oct. 25, 1985

[51] Int. Cl.⁴ ............................................. G10L 5/06
[52] U.S. Cl. .................................... 381/43; 381/51; 364/513.5
[58] Field of Search ................ 381/43, 51; 364/513.5

[56] References Cited

U.S. PATENT DOCUMENTS

| | | | |
|---|---|---|---|
| 4,419,730 | 12/1983 | Ito et al. | 381/51 |
| 4,450,545 | 5/1984 | Kishi et al. | 364/513.5 |
| 4,528,687 | 7/1985 | Noso et al. | 381/43 |
| 4,534,056 | 8/1985 | Feilchenfeld et al. | 364/513.5 |
| 4,558,459 | 12/1985 | Noso et al. | 381/43 |
| 4,590,604 | 5/1986 | Feilchenfeld et al. | 364/513.5 |
| 4,593,403 | 6/1986 | Kishi et al. | 381/43 |
| 4,653,097 | 3/1987 | Watanabe et al. | 364/513.5 |

Primary Examiner—Patrick R. Salce
Assistant Examiner—Anita M. Ault
Attorney, Agent, or Firm—Watts, Hoffmann, Fisher & Heinke

[57] ABSTRACT

A voice actuated control system for a motor vehicle. A microphone mounted to the vehicle senses user commands as well as other noise in the passenger compartment. Analog electrical signals from the microphone are converted into digital form and compared by a high speed microprocessor with a user profile. A correspondence between the profile and the sensed input causes a control function such as raising or lowering a window to be performed. A speech synthesizer in the system prompts the user in the event a command in a command sequence is inappropriate.

4 Claims, 8 Drawing Sheets

Fig. 5B

VEHICLE VOICE RECOGNITION METHOD AND APPARATUS

TECHNICAL FIELD

The present invention relates to a voice actuated control system for a vehicle.

BACKGROUND ART

Microprocessor controllers have been used with success in motor vehicle control and communications systems. Speech synthesizers for example, provide audible warnings to a vehicle operator. Mobile telephone units have been and are increasingly used to conduct one's business from an automobile. Microprocessor technology has made possible use of small onboard computers with cathode ray tube displays for apprising the user of the status of his or her vehicle and also facilitate interactive control of the vehicle.

The speech synthesizer makes less likely the situation in which a user has been warned of a problem but fails to perceive the warning. Thus, speech synthesizers used in an automobile apprise the user of a lack in oil pressure, a failure in the headlights, an unbuckled seatbelt, a door that was ajar, or any other warning. The speech synthesizer has been an effective one way communication link to the user.

A cathode ray tube, positioned in close proximity to the user can not only apprise the user regarding the status of his vehicle i.e. speed etc. but can be used as a tactile input for entering control functions. The CRT unit can include a touch sensitive screen whereby the user is prompted by visual outputs from the screen to enter control commands at the screen. Touch screen systems have been successfully implemented on computer controlled displays in the prior art and there is no apparent reason they can not be incorporated into an automobile.

Cellular phone systems are being used to expand the communications capability of a vehicle operator for both business and personal use. Unlike prior art mobile telephones, the cellular phone can connect with a remote telephone without operator intervention. This feature of cellular phone operation is anticipated to make the use of phones in automobiles much more prevalent than in the past. More and more geographic locations are being equipped with cellular phone capability to accommodate this perceived demand.

These enhancements in technology have caused concern that the growing sophistication of vehicle operation may paradoxically have an adverse affect on an operator's ability to control his or her vehicle. If the driver's attention is focused on a computer screen or telephone inside the vehicle, his attention on what is happening outside the vehicle is diminished. As a vehicle operator drives the car, there is a temptation to attempt to communicate via the cellular phone. To do so, the operator must remove his attention from his driving activities to dial the phone. Specifically, he must direct his attention away from the road to a pushbutton key pad on the phone to dial his intended number. This may also involve the act of looking up the number in a notepad or the like. Thus, the operator's attention is momentarily disrupted as he places the call.

It is illegal in many states for one to operate a phone from a moving car. To comply with this law, the operator must pull to the side of the road before making his phone call. In practice, it is clear that drivers are using their phone systems without regard to the safety hazards created by such use. Unless and until motor vehicle operation becomes completely automated so that collisions are avoided automatically through vehicle sensors or routing control schemes, increased sophistication can have a deleterious impact on road safety.

DISCLOSURE OF INVENTION

The present invention allows a vehicle operator to safely maintain control of a motor vehicle while at the same time allowing a high degree of sophistication in that control. A voice actuated control system is employed whereby the vehicle operator can institute control and/or communications without shifting his attention away from the road. The system is interactive in that a speech synthesizer incorporated into the system responds to command inputs from the user as well as prompting the user under certain circumstances.

The present system of voice actuated vehicle control is implemented with high speed control circuitry. The system includes a transducer mounted within the vehicle to receive a vocal input from the vehicle user. This voice signal input is digitized with a sampling circuit and input to a high speed signal processor. The input command word is then compared with a user voice profile unique to the vehicle operator. A control circuit responds to the recognition circuit in the event of a match between the user input and the user's voice profile by performing a control function.

In a preferred system the recognition circuit responds to a number of control inputs to perform a variety of tasks. These tasks include but are not limited to dialing a telephone, rolling up and down the windows, turning on the radio and adjusting the radios volume and station selection.

One problem encountered in implementing a voice actuated system is in detecting the command signal from the user and rejecting other sounds in the vicinity of the sound transducer. These extraneous sounds originate from a number of sources including other passengers within the vehicle, the vehicles radio, and road noise emanating from a number of possible sources outside the vehicle. To avoid false recognition from these sources, the system uses two microphones and also de-activates a vehicle radio under certain circumstances.

The voice patterns for a particular user are unique. Two speakers pronouncing a given word generate different voice patterns. For this reason, the system stores voice patterns unique to a specific vehicle operator and uses the stored voice patterns in comparing voice inputs from the transducer to determine a command sequence. In one embodiment a storage module is inserted into the system which has been preprogrammed during a training session. Data from this module is stored in a memory space of a voice actuation system controller and is used in identifying user inputs.

The system has particular applicability with a telephone system. A system controller interfaces with a telephone and responds to control inputs to automatically dial one of a number of stored telephone numbers. Alternately, by first activating and then speaking the number into the transducer, the vehicle operator can dial a number not stored or preprogrammed within the system. The operator is not distracted in dialing the telephone so that use of the telephone becomes no more hazardous than talking with a person sitting next to the vehicle operator.

A hierarchal command scheme is preferably used with the voice actuated control system. With this design, the system responds to certain commands depending upon how the user has reached a particular position within the command organization. The system allows the user to speak phrases which correspond quite closely to phrases he or she might think of in making a certain request. This hierarchal system reduces operator training time and speeds the response time of the system. If the user becomes confused and/or forgets the procedure for a command the system prompts the user via a speech synthesizer unit incorporated in the system.

It is also possible, of course, for the user to override the voice command system and perform a control function manually. Thus, if the user is having trouble adjusting the radio, he can reach to the radio and make appropriate adjustments manually. At a later time, he can either retrain himself into proper operation of the voice system or allow the speech synthesizers prompts to lead him through the proper procedures.

From the above it should be appreciated that one object of the present invention is a control system that is voice actuated and can perform a number of vehicle control functions without unduly distracting the vehicle operator. These and other objects, advantages and features of the invention will become better understood when a detailed description of a preferred embodiment of the invention is described in conjunction with the accompanying drawings.

BEST MODE FOR CARRYING OUT THE INVENTION

Figure 1:
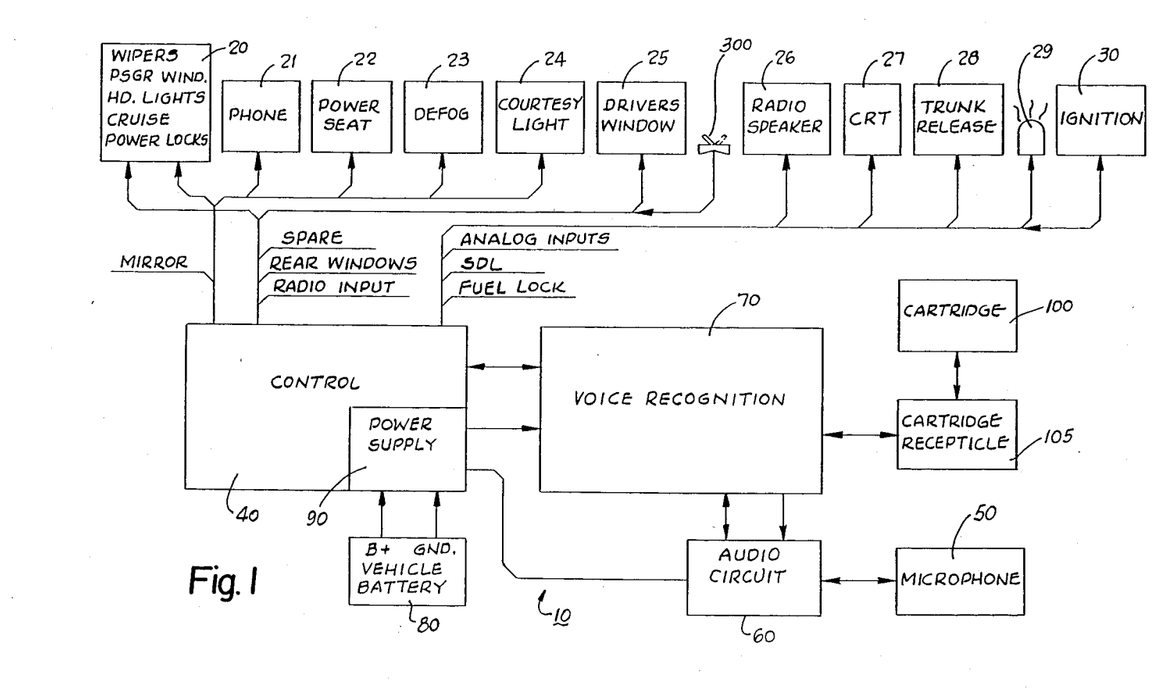
FIGS. 1, 2A and 2B are schematics of a voice recognition system of the present invention.
Figure 2A:
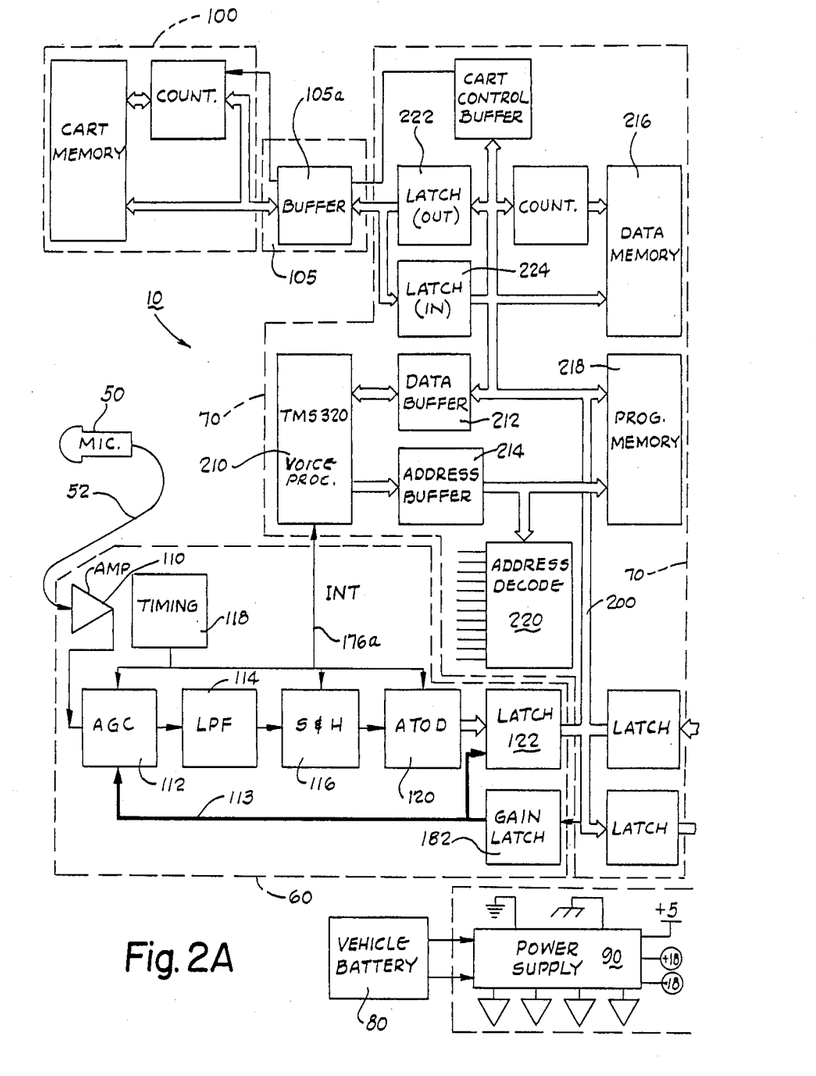
Figure 2B:
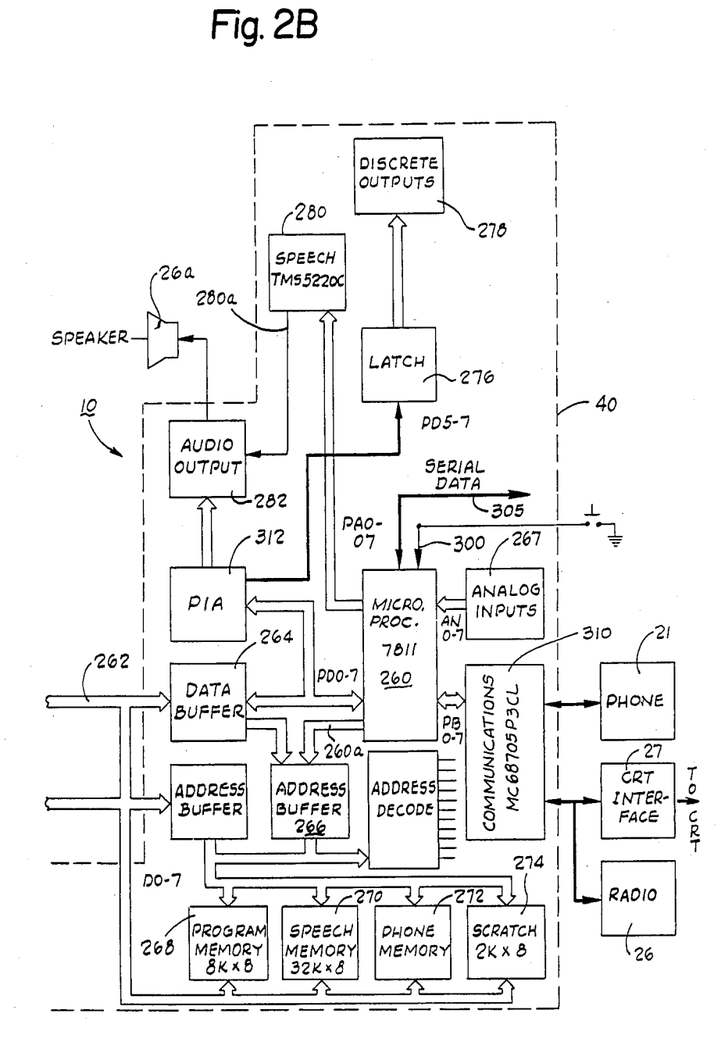

Turning now to the drawings, FIGS. 1, 2A and 2B depict a vehicle control system 10. The system 10 is illustrated in broad outline in FIG. 1 and the components illustrated in block diagram format in FIG. 1 are described with more particularity in FIGS. 2A and 2B. As seen in FIG. 1, a number of vehicle components or subsystems 20-30 are coupled to a microprocessor control circuit 40. Outputs from the control circuit 40 activate and control the operation of the various vehicle components. As an example, the controller circuit 40 can initiate adjustment of a seat via an output to a motor in a power seat subsystem 22 to adjust the positioning of the seat. In a similar manner, the drivers windows 25 may be raised and lowered, the radio 26 turned on and off as well as tuned, and information can be displayed on a cathode ray tube 27. One feature which will be described with more particularity below is the interaction between the controller circuit 40 and a cellular telephone 21.

Each of the subsystems 20-30 depicted in FIG. 1 can be manually operated by a vehicle operator, but can also be controlled via a voice input through a microphone 50 connected to a audio input circuit 60. The analog circuitry of the audio circuit 60 is coupled to a voice recognition circuit 70 which monitors inputs from the audio circuit 60 and compares those inputs representing a voice command with command profiles used by the voice recognition circuit 70 to determine which command has been spoken.

As illustrated schematically in FIG. 1, the audio input circuitry 60, voice recognition circuit 70 and control circuit 40 are powered by a vehicle battery 80 connected to a power supply circuit 90. In analyzing voice inputs from the microphone 50, the voice recognition circuit 70 utilizes information stored in a memory cartridge 100 which interfaces the voice recognition circuit through a cartridge interface 105. The cartridge 100 mates with the control system 10 via a multipin connector that mates with a corresponding multi-contact receptacle. The voice recognition circuit 70 includes a microprocessor having an operating system which loads voice profiles from the cartridge 100 into microprocessor memory on power up of the system. The circuit 70 then monitors microphone inputs from a vehicle operator to determine when a command has been articulated by the operator and if so, what command has been spoken.

Audio Input

As seen in FIG. 2A, the audio circuit 60 is coupled to the microphone 50 and includes an input amplifier 110 which amplifies analog electrical signals which have been converted from mechanical soundwaves received at the microphone 50. The amplifier 110 is coupled to an automatic gain control circuit 112 which receives an input from the amplifier 110 and generates an output which has been scaled by a factor dictated by a digital input 113 to the automatic gain control circuit 112. This gain control assures that the output from the audio circuitry 60 is maintained at an appropriate level for input to the voice recognition circuit 70.

An analog output from the automatic gain control circuit 112 passes through a low-pass filter 114 to a sample and hold circuit 116. Timing of this transferral is controlled by a timing circuit 118 having a number of flip-flops which coordinate transmission of the analog signal to the sample and hold circuit 116. From the sample and hold circuit, the analog data is transmitted to an analog to digital converter 120, again at a rate controlled by the timing circuit 118. The analog to digital converter converts the analog input from the microphone which has been suitably adjusted in magnitude and filtered to a latch output 122 from the audio circuit 60. The output from the latch circuit 122 is a digital indication of the magnitude of the analog input signal from the microphone 50.

Figure 3:
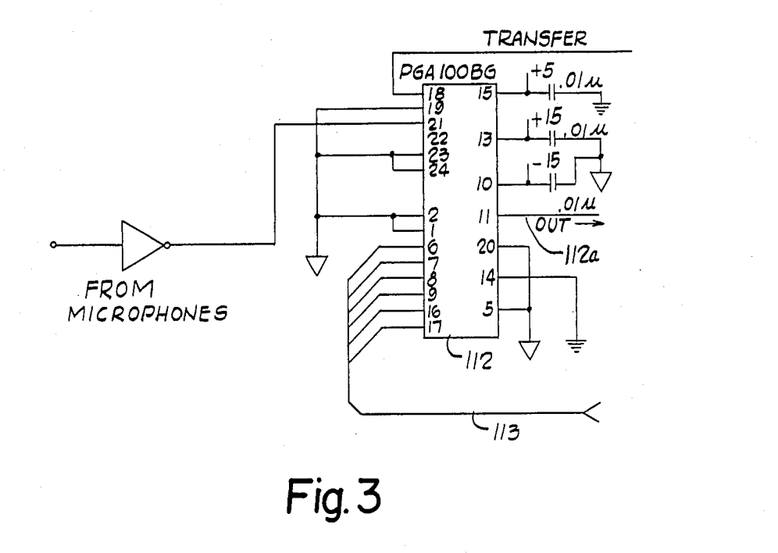
FIGS. 3 and 4 illustrate input portions of the FIG. 1 system for transmitting signals from a system microphone to a voice recognition controller.
Figure 4:
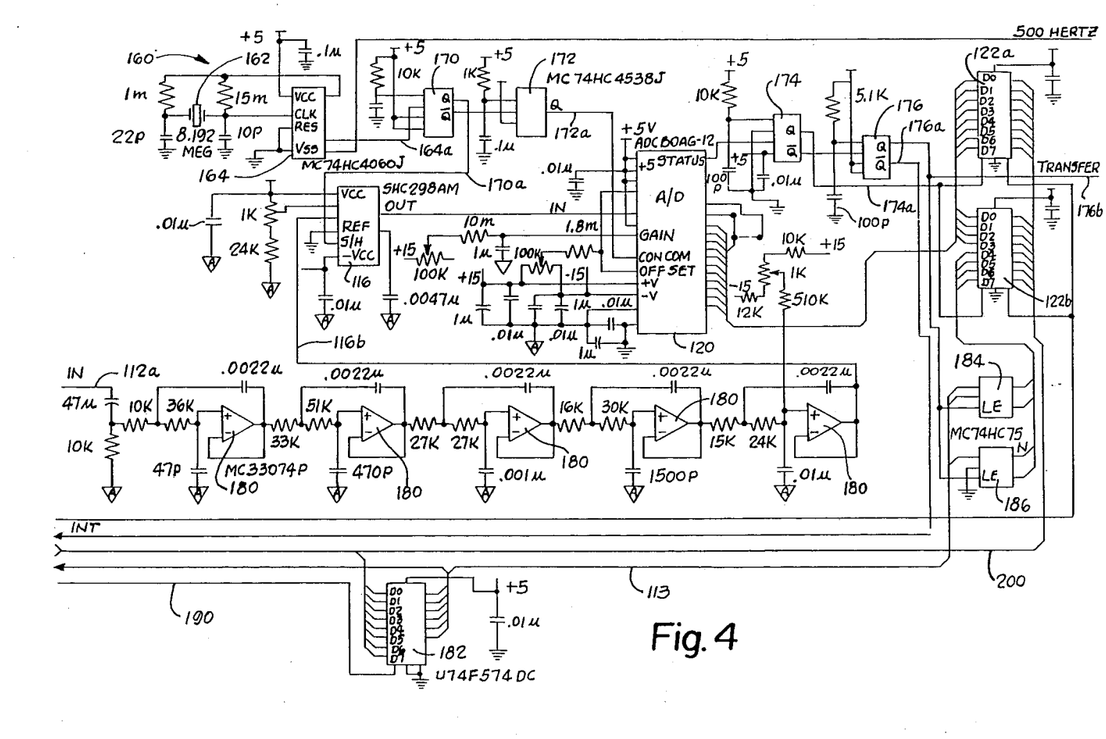

FIGS. 3 and 4 disclose specifics of the analog audio input circuit 60. In those figures preferred values of resistors, capacitors, and integrated circuit components are designated, but it is appreciated suitable equivalent components can be substituted for those disclosed.

Although a single microphone 50 is schematically shown in FIG. 2A, a preferred control system utilizes two microphones oriented perpendicularly to each other in the vicinity of a vehicle operator. In one system, these microphones are mounted to a vehicle steering wheel directly in front of the operator.

Use of these two microphone inputs cancels noise within the vehicle compartment. One microphone is oriented to receive voice commands in essentially a straight line path from the operator. A second microphone at right angles monitors voice commands less efficiently than the first. Both microphones respond equally well to extraneous noise so this noise cancels when the voice commands from the two microphones produce a differential output from the amplifier 110.

A cable 52 (FIG. 2A) coupling the microphones 50 to the amplifier 110 is shielded. Transfer timing signals for the automatic gain control circuit 112 are generated by the FIG. 3 circuitry and are discussed below. The digital input 113 dictates the size of an output signal 112a from pin 11 on the automatic gain control circuit 112. By adjusting the size of the output 112a, the analog inputs from the microphone are properly sampled with minimum distortion. The output signal 112a from the gain circuit 112 is sampled at a rate controlled by the timing circuit 118 (FIG. 4).

Data Acquisition Timing

Turning now to FIG. 4, the timing circuit 118 will be described with particularity. An 8 kilohertz signal is generated by an oscillator circuit 160 including a 8 megahertz crystal oscillator 162 coupled to a frequency divider 164. An output 164a from the frequency divider has a frequency of 8 kilohertz and a duty cycle of 50%. During each oscillation of this signal, the sample and hold circuit 116 acquires one sample from the microphone 50. The period of the 8 kilohertz signal is 125 microseconds. A preferred audio circuit 60 shown in FIGS. 3 and 4 is capable of acquiring the data in 100 microseconds so that the 8 kilohertz duty cycle is large enough to satisfy the Nyquist relation for data sampling while being slow enough to allow the circuitry to accurately acquire the voice data before a subsequent analog input is acquired by the sample and hold.

The timing circuit 160 includes four flip-flops 170, 172, 174, 176 (FIG. 4) configured as one-shot circuits. The first two one-shots 170, 172 have outputs 170a, 172a connected to the sample and hold circuit 116 and analog to digital converter 120. The first one-shot 170 has an output 170a causing the sample and hold circuit 116 to acquire an analog signal at an input 116b. This input 116b corresponds to the output 112a from the automatic gain control circuit 112 (FIG. 3) which has been filtered by the low-pass filter 114 which includes a series of five operational amplifiers 180. An output from the sample and hold 116 is connected to the analog to digital converter 120. The analog to digital converter 120 acquires this data in response to an output 172a from the second flip-flop 172. This second flip-flop 172 is clocked by the first flip-flop 170 so that each time the sample and hold circuit 116 acquires an analog input, the analog to digital converter latches onto the signal and performs its analog to digital conversion.

At the end of each analog to digital conversion a status output on the analog to digital converter 120 changes state and clocks the third one shot 174. This one shot 174 has an output 174a connected to an enable input on two data buffers 122a, 122b. A signal at the output 174a causes the two buffers 122a, 122b to latch data from the output of the analog to digital converter 120. In the particular embodiment illustrated in FIG. 4, twelve bits of digital information are latched into these buffers upon receipt of the output 174a from the one shot 174. This one shot 174 also clocks a fourth and final one shot 176.

This last one shot 176 performs three functions in the data acquisition process. One output 176a interrupts a voice processor 210 (see FIG. 2A) in the voice recognition circuit 70 to indicate a digital voice signal is available at the latch 122. A second output 176b generates a "transfer signal" to pin 18 of the automatic gain control circuit 112 (FIG. 3) to cause the automatic gain control circuitry to acquire an updated gain control setting.

Returning briefly to FIG. 2A, the audio input circuit 60 is coupled to the voice recognition circuit 70 via a data bus 200. The data bus 200 is a 16 bit bi-directional data path for carrying digital information from the analog input circuit 60 to the microprocessor 210 in the voice recognition circuit 70. In an opposite direction, the data bus 200 transmits automatic gain information from the voice recognition circuit 70 to a latch 182 (FIGS. 2A and 4) coupled to the digital input bus 113. Upon receipt of a data acquisition signal at an input 190 from the voice circuit 70 the latch acquires data on the bus 200 and places that data on the six bit data bus 113. It is this data bus 113 which carries a digital control signal to the automatic gain circuit 112 regarding scaling to be performed on the analog inputs from the microphone.

The data bus 113 is also seen coupled to two data buffers 184, 186 (FIG. 4) having an output connected to the latch 122B. When the fourth flip-flop 176 (FIG. 4) generates a transfer output at output 176b, it also generates an enable input to these buffers 184, 186. This causes the output from the latch 182 to be transmitted to the latch 122b and thereby becomes part of the sixteen bits of data transmitted back to the microprocessor 210 along the data bus 200.

The circuitry thus far described can be summarized by noting that the circuitry in FIGS. 3 and 4 operates to control the magnitude of the analog input signals to the analog to digital converter 120 and at a rate of 8 kilohertz provides sixteen bits of information at the bus 200 for receipt by the microprocessor 210. These sixteen bits of information includes twelve bits characterizing the analog input from the microphone 50 and four bits characterizing the gain control used in scaling this input signal.

Voice Recognition

Returning now to FIG. 2A, operation of the voice recognition circuit 70 will be summarized. The microprocessor 210 has data and address buffers 212, 214 which interface data and address ports on the microprocessor 210. Coupled to these two buffers 212, 214 are memory circuits 216, 218 which send and receive data along the data bus 200 under control of an address decoder 220 coupled to the address buffer 214.

A first circuit 216 defines a thirty-two kilobyte memory space for storing command profiles unique to a particular user. The second memory circuit 218 stores the voice recognition program in six kilobytes of memory space. Upon power-up of the system, voice data unique to a particular user is loaded into the memory circuit 216 from the memory cartridge 100 (FIG. 1) through the interface 105 which includes a buffer 105a coupled to two latch circuits 222, 224. This data is then stored in the data memory 216 for access by the microprocessor 210 during voice recognition operation.

Figure 5A:
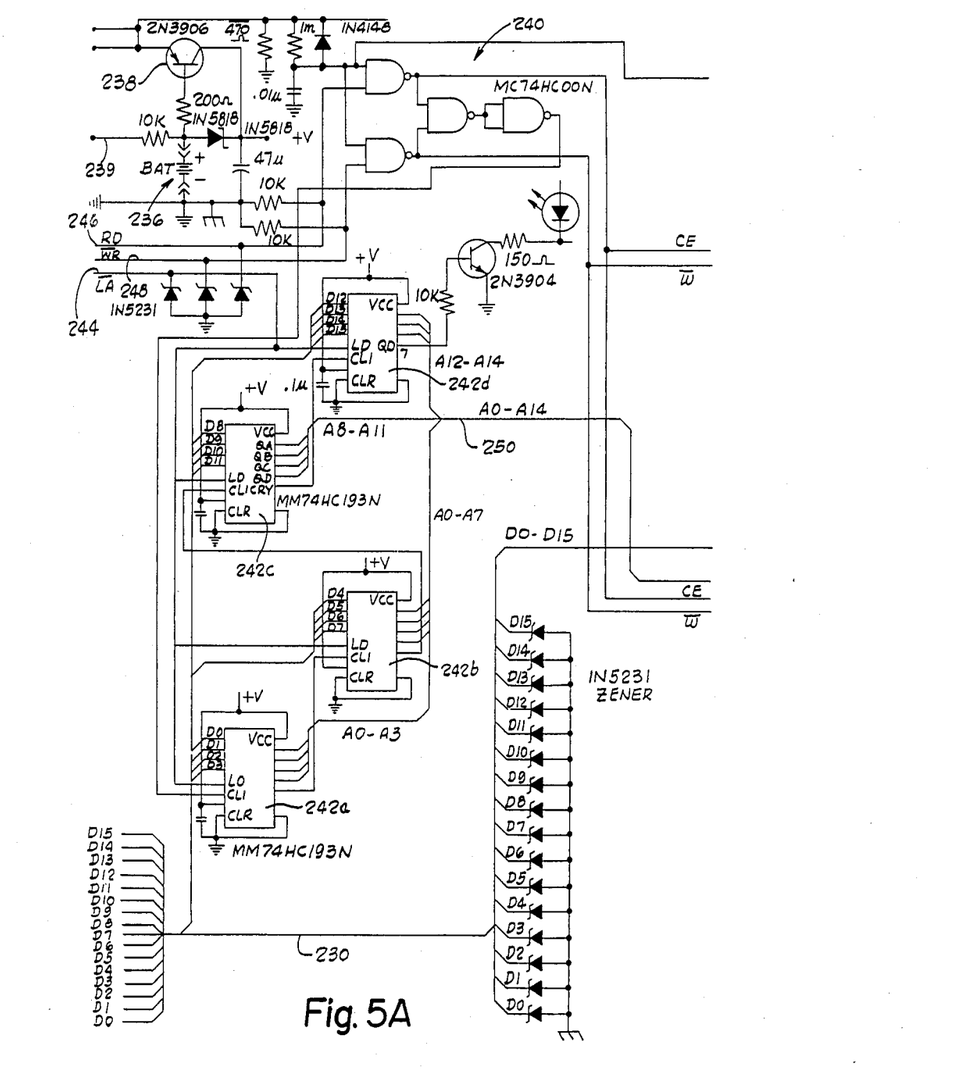
FIGS. 5A and 5B show a schematic of a memory module for storing a number of command profiles for a particular operator.
Figure 5B:
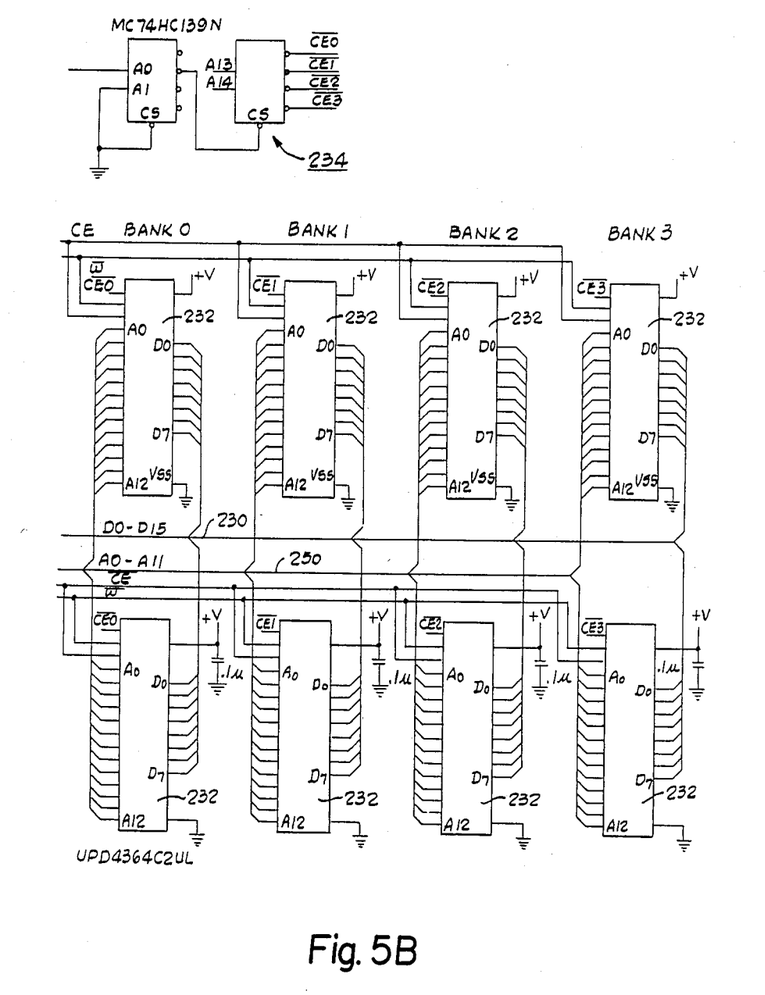

FIGS. 5A and 5B illustrate the organization of the memory cartridge 100. At the lower left of FIG. 5A a sixteen bit data bus 230 interfaces with the buffer 105a. This data bus 230 is coupled to a number of memory circuits 232 (FIG. 5B) which are organized into four banks of data. These memory circuits 232 are eight kilobyte capacity random access memory (RAM) circuits. The four banks of memory illustrated in FIG. 5B, therefore, constitutes 32 kilobytes of memory. A bank select circuit 234 determines which of the particular four banks is active during a particular read or write operation.

Returning to FIG. 5A, the memory cartridge 100 includes a battery 236 which continually supplies a positive voltage (+V) to the memory circuits 232 whether or not the cartridge 100 is connected to the control system 10. This 3.5 volt battery is connected to a battery charging transistor 238 which charges a nickel-cadmium battery 236 with the module 100 coupled to the system 10. An alternate battery 236 is a Lithium battery which is not recharged but is instead replaced as needed. An output 239 from a positive battery terminal is coupled to the voice circuit 70 and indicates when a memory cartridge has been inserted into the system for voice recognition operation.

Writing data to the memory circuits 232 and reading data from those memory circuits is controlled by read 246, write 248, and latch 244 signals from the voice recognition circuit 70. These signals are seen in FIG. 5A to be coupled to a logic circuit 240 and four counters 242a, 242b, 242c, 242d. An input from the voice recognition circuit 70 at the latch input 244 causes the counters 242 to latch onto the sixteen bit data presented by the voice recognition circuit 70 on the bus 230. This data information corresponds to the address of a particular memory circuit 232 within the memory space of the cartridge 100. Receipt of either these two signals 246, 248 results in either a write or circuit enable signal being transmitted to the memory circuits 232. Additionally, the trailing edge of either the read or the write signals 246, 248 causes the counter to be incremented. when a circuit enable signal is generated, sixteen bits of data are presented by an appropriate bank in the memory space of the cartridge to the data bus 230.

A review of the addressing system of the cartridge 100 indicates that thirteen address lines uniquely identify a memory location within a particular bank and that two address lines (A13 and A14) are used to select one of the four banks via an input to the bank select circuit 234. Upon power-up of the control system 10 one of the first steps performed by the microprocessor 210 is the accessing and storing of 32 kilobytes of data from the memory cartridge 100 to the data memory circuits 216 of the voice recognition circuit 70.

Command Programming

Programming or storing of the data within the cartridge 100 is accomplished under control of a microprocessor 260 in the command circuit 40. The training program by which a user generates the profile information for the cartridge 100 is an interactive sequence of commands and responses to those commands. During this training sequence, a speech synthesizer 280 (FIG. 2B) prompts the user to repeat certain commands three times in sequence so that vector coefficients characterizing the command can be stored in memory. These training inputs are normalized to take into account possible variations in user pronunciation. This averaged profile is used to create characterization coefficients which are stored in the cartridge 100 for each of a number of input commands.

Techniques for generating user profiles are known in the voice recognition art. In particular, reference is made to the following two prior art printed publications. IEEE Transaction of Acoustical Speech and Signal Processing, "Dynamic Programming Algorithm Optimization for Spoken Word Recognition", Sakoe et al. vol. ASSP— 26 pp. 43–49, February 1978 and "On Creating Sampling Templates", Y. I. Liu, ICASSP, 1984. These publications are incorporated herein by reference.

Table 1 below lists eighty-seven command words for a preferred command system 10. Each of these words is programmed into the memory cartridge 100 using the interactive programming sequence implemented under control of the microprocessor 210.

The microprocessor voice recognition program in the memory 218 includes an algorithm for continuingly comparing coefficients characterizing data inputs from the microphones with the command coefficients in the data memory 216. The feature vectors used for comparison are linear predictive coding coefficients extracted from the input samples every 16 milliseconds. These coefficients are compared with coefficients characterizing the command words listed in Table 1. The microprocessor 210 generates the characterizing coefficients and chooses the two words from the Table 1 list whose coefficients most closely match the spoken word. These words are then transferred to the control circuit 40. The command microprocessor 260 then determines the appropriateness of the words to a given situation. If one of the words is appropriate, the microprocessor responds by either executing a command or moving onto a next level of a command sequence. If neither of the two words is appropriate the microprocessor 260 either prompts the user or merely ignores the inappropriate command.

TABLE 1

| 1. | car name | 45. | on |
|---|---|---|---|
| 2. | tune | 46. | off |
| 3. | fast | 47. | climate |
| 4. | seek | 48. | auto |
| 5. | balance | 49. | fan |
| 6. | front | 50. | cool |
| 7. | lights | 51. | warm |
| 8. | high | 52. | heater |
| 9. | low | 53. | economy |
| 10. | courtesy | 54. | bi-level |
| 11. | lock | 55. | defrost |
| 12. | unlock | 56. | trip monitor |
| 13. | menu | 57. | odometer |
| 14. | stop | 58. | trunk |
| 15. | one | 59. | return |
| 16. | two | 60. | enter |
| 17. | equalizer | 61. | reset |
| 18. | yes | 62. | clear |
| 19. | no | 63. | resume |
| 20. | door | 64. | accelerate |
| 21. | retrain | 65. | mode |
| 22. | right | 66. | summary |
| 23. | left | 67. | up |
| 24. | sixty | 68. | down |
| 25. | radio | 69. | set |
| 26. | volume | 70. | three |
| 27. | two-fifty | 71. | four |
| 28. | ten | 72. | five |
| 29. | AM | 73. | reassign |
| 30. | FM | 74. | rear |
| 31. | recall | 75. | cruise |
| 32. | listing | 76. | six |
| 33. | coast | 77. | seven |
| 34. | scan | 78. | eight |
| 35. | defog | 79. | nine |
| 36. | window | 80. | zero |
| 37. | three-kay | 81. | one-kay |
| 38. | ten-kay | 82. | phone |
| 39. | metric | 83. | store |
| 40. | time | 84. | send |
| 41. | speed | 85. | end |

TABLE 1-continued

| 42. | mist   | 86. | star  |
|-----|--------|-----|-------|
| 43. | wipers | 87. | pound |
| 44. | wash   |     |       |

The voice recognition processor 210 performs the four main tasks of predictive coding feature extraction, word boundary detection, training and word recognition. It detects the begining and ending of the input word and then characterizes that word by matching it to an entry in its limited vocabulary. A preferred voice recognition processor 210 is a TMS 32010 high speed processor chosen for its high speed mathematics capacity which makes it especially suitable for rapid calculation of the linear predictive coding coefficients and comparison of these coefficients with those characterizing the voice profiles of the operator.

Vehicle Control

The control circuit 40 centers around the microprocessor 260 which interacts with a controller data bus 262 via a data buffer 264. A microprocessor address port 260a is coupled to an address buffer 266. The microprocessor 260 sends and receives data via the data bus 262 and in particular executes an operating system program stored in a program memory 268. The microprocessor memory space also includes a speech memory unit 270, a telephone memory unit 272, and a scratch pad memory unit 274.

The microprocessor 260 monitors various analog inputs 261 and generates digital outputs on the data bus 262 which are accessed by a data latch circuit 276 via the PIA 312. Discrete outputs 278 from the latch 276 include control outputs to various ones of the subsystem in FIG. 1 such as trunk release, rear window defogger, etc. The analog inputs 261 include signals from various sensors indicating the condition of the vehicle. The control circuit 40 also includes a speech synthesizer circuit 280 coupled to the control microprocessor 260. At an appropriate time as dictated by the operating system of the microprocessor 260, the speech unit 280 is directed to generate audible instructions to the vehicle operator. The speech unit 280 generates an appropriate analog output 280a which is amplified by an audio output circuit 282 and directed to radio speakers 26a schematically indicated in FIG. 2B. While not illustrated in FIG. 2B, the audio output circuit 282 also includes a chime circuit for generating audible tones of certain frequency and duration. Further, the audio output circuit 282 includes an automatic gain control which responds to outputs from the control microprocessor 260 to regulate the level of both chimes and speech. Further details of a speech synthesizer circuit are disclosed in co-pending U.S. patent application Ser. No. 525,315 to Dolph et al which was filed Aug. 22, 1983 and is incorporated herein by reference.

Figure 6:
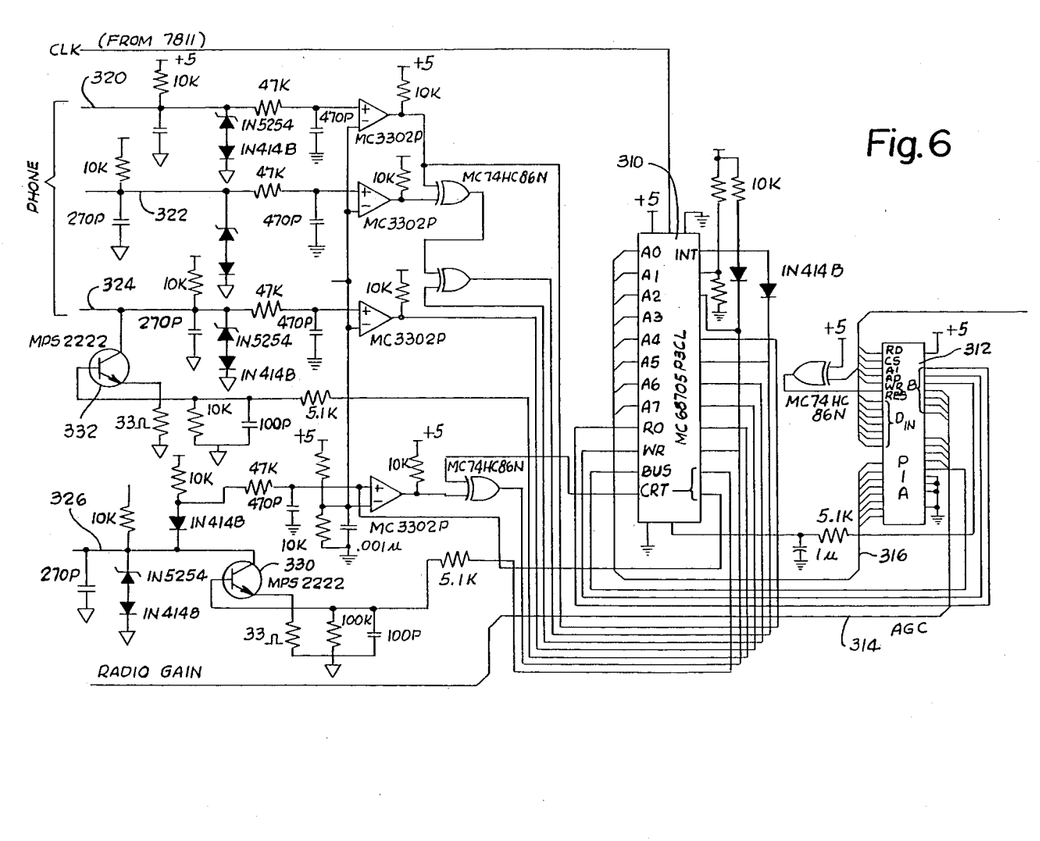
FIG. 6 is a schematic of a communications processor for controlling operation of a vehicle telephone.

Also included in the control circuit 40 is a special dedicated communications microprocessor 310 connected to a cellular telephone 21, a CRT interface module 27 and the vehicle radio 26. Details of the interconnection of the communications microprocessor 310 with the subsystems are illustrated in FIG. 6 and will be described below.

The microprocessor 260 must respond to signals from the voice recognition microprocessor 210 and generate an appropriate response to the subsystems 20–30 (FIG. 1) to initiate vehicle control. This response may be via a command to the communications microprocessor 310, by controlling the status of the input to the latch 276 which in turn causes the outputs 278 to be generated to an appropriate subsystem 20–30, or by initiating an audible output from the speech processor 280.

The microprocessor operating system executes a command and/or generates an appropriate audible prompt depending upon the status of the vehicle as indicated by the analog inputs as well as dependent upon the particular command sequence the user has already entered. Table 2 below illustrates a command input organization for control of the vehicle lights.

TABLE 2

| Car Name | | |
|---|---|---|
| | Lights | high |
| | | low |
| | | courtesy |
| | | menu |
| | | abort |

The command sequence begins with the user articulating the car name which has been programmed into the system during an input training session when each of the commands listed in Table 1 is repeated three times. Upon recognition of the car name, the microprocessor 260 awaits receipt of a next suitable command from the user. If the user speaks the word "Lights" the system 10 activates a listening light with a signal at the discrete output portion 278 of the circuit 40 for ten seconds and if during this time the vehicle head lights are on, the system responds to the four prompts listed in Table 2 in the next lower level in the hierarchy of commands. The listening light gives the operator a visual indication that the voice recognition system is active and is waiting for a command to be spoken. Failure to speak causes the system to return to an idle state awaiting the car name input.

In response to receipt of the term "high" the high beams are activated. In response to the command "low" the low beams are activated. In response to the term "courtesy" the system activates the courtesy lights if they are off and deactivates the courtesty lights if they are already on. In response to the command "menu", the control system 10 sequentially causes the speech processor 280 to articulate the words "high", "low", and "courtesy". This enables the user to be retrained in the event he or she recognizes the fact the command "lights" is the proper entry to the command sequence for controlling the lights but has forgotten these specific commands to activate that control. In the event the user cannot remember the fact that the command "lights" allows him to enter the specific control portion of the lights menu, he or she can prompt the system into a retraining mode wherein each of the commands for the vehicle is listed in turn. In response to the final command, "abort", the system returns to the idle mode.

This hierarchy of command allows the user to speak short simple command sentences to accomplish control tasks while driving. Thus, if the user has assigned the word "Buick" as the car name, the statement of the sentence "Buick", "lights", "high" will activate the vehicle's high beams.

One feature of the hierarchy of commands in accordance with the invention is the way in which the microprocessor 260 responds to commands depending upon the sequence of commands that the operator has spoken. In the previous example, after the user has articulated the word "lights", the control circuit 40 expects the user to articulate one of the four terms "high", "low", "courtesy" or "menu". Under appropriate circumstances the system responds to each of the commands listed in Table 1, but after reaching the lowest level in the "lights" command sequence the system will not respond to a "cruise" command, for example, unless a command sequence (car name) is stated again. The system 10 will respond to only one of the four appropriate inputs for adjusting the lights and will not adjust the seat even if an appropriate seat control command is then articulated.

Cellular Telephone

The command sequence for the cellular telephone is substantially more complex than the command sequence for adjusting the vehicle lights. Table 3 documents this sequence. Most functions that are manually entered by keypad on the telephone handset can be duplicated by the system 10 in order to free the user's hands and eyes to concentrate on driving. All of the identifying words used on the handset control buttons are the same words used by the system.

TABLE 3

| Level 1 | Level 2 | Level 3 | Level 4 | Level 5 | Level 6 |
|---------|---------|---------|---------|---------|---------|
| (Car Name) | | | | | |
| | Menu | | | | |
| | Abort | | | | |
| | Phone | recall | | | |
| | | lock | | | |
| | | end | | | |
| | | store | | | |
| | | clear | | | |
| | | send | | | |
| | | listing | (listing 1) | | |
| | | | (listing 2) | | |
| | | | (listing 3) | | |
| | | | (listing 4) | | |
| | | | (listing 5) | | |
| | | | (listing 6) | | |
| | | | (listing 7) | | |
| | | | (listing 8) | | |
| | | | (listing 9) | | |
| | | | menu | | |
| | | | abort | | |
| | | | reassign | 1 | |
| | | | | clear | |
| | | | | yes | |
| | | | | no | |
| | | | | store | |
| | | | | 0 | |
| | | | | 1 | |
| | | | | 2 | |
| | | | | 3 | |
| | | | | 4 | |
| | | | | 5 | |
| | | | | 6 | |
| | | | | 7 | |
| | | | | 8 | |
| | | | | 9 | |
| | | | | star | |
| | | | | pound | |
| | | | | menu | |
| | | | | 2 | same as "1" |
| | | | | 3 | same as "1" |
| | | | | 4 | same as "1" |
| | | | | 5 | same as "1" |
| | | | | 6 | same as "1" |
| | | | | 7 | same as "1" |
| | | | | 8 | same as "1" |
| | | | | 9 | same as "1" |
| | | | | abort | |
| | | | | menu | |

Upon recognition of the word "Phone" the system 10 activates the 'listening' light 29 for ten seconds and responds according to the next level of inputs. Power to the cellular telephone turns on with vehicle ignition.

With the exception of the "mute" and "pwr" buttons, the system 10 permits the vehicle operator to emulate all keypad functions through voice control, by merely speaking a button name rather than depressing that same button. Utilization of voice to ellicit control of telephone functions frees an operators hands and eyes from the device, permitting the individual to more fully concentrate on the demands of driving.

Recognition of any of the words associated with a keypad button (Level 3) causes an action to occur that is identical to the action that would result upon depression of that particular button. The following list details the keypad buttons/commands:

| 0 | 1 | 2 |
|---|---|---|
| 3 | 4 | 5 |
| 6 | 7 | 8 |
| star | 9 | pound |
| recall | clear | send |
| store | *mute | end |
| *pwr | lock | |

*denotes a keypad button not emulated by the system 10.

The listing command (Table 3) is unique to the system control of the telephone. The function of "listing" is to provide a personalized telephone directory of nine listings to the user. Each listing is, through training, identified with a particular name and phone number. The "listing" command activates the level 4 "listing" group; this makes available the personalized directory and the option, "reassign", to train and to change phone numbers and names.

Upon recognition of a particular listing the system retrieves the phone number associated with that listing from the memory 100 and sends it to the cellular telephone's display. Additionally, having recognized a word identified with a particular listing, the system returns to the level 3 "phone" group of commands. From this level, a "send" command places the call.

Upon recognition of the word "reassign" followed by one of the words "one" through "nine", the system 10 responds with a prompt asking the user if he or she wishes to re-assign that listing.

If the user responds with the word "yes" the system 10 prompts the user to give the new listing name. The user should then respond with a proper name, title or one word description (such as "Bill", "office", "emergency"), each utterance being prompted by a single chime. If the user fails to respond or responds with the word "no" the system does not give that listing a new designation.

The system 10 then asks the user if a new number is desired. If the user desires to change the phone number associated with the particular listing, then the user should respond with the word "yes". The module then prompts the user to enter the new number. The user responds with a series of single numerals to complete the training session. As the numerals are spoken, they appear on the telephone's display. If an incorrect number is input, the user may clear the number by saying the word "clear". To allow for various length telephone numbers, the entry of digits is terminated with the word "store". After entry of a telephone number, the system exits the reassignment mode and return the user to the "listing" level (Level 4) of the "phone" option. If the user does not respond within ten seconds or responds with the word "no", the system returns to the "listing" level of the "phone" option.

Telephone numbers for (Listing One) through (Listing Nine) are stored in the memory 100. This is a personalized telephone directory for the owner and can only be altered through the system.

These memory locations are contrasted with the telephone memory comprised of thirty locations (01 through 30) which can be accessed both through the telephone keypad and the command system 10 using the "store" and the "recall" functions. (Listing One) through (Listing Nine) cannot be accessed through the telephone keypad.

Upon recognition of each of the words: "Zero", "One", "Two", "Three", "Four", "Five", "Six", "Seven", "Eight" and/or "Nine", (Table 3) there appears a corresponding numeric display on the screen of the handset. Numeric entries enable the user to enter new or seldom used telephone number, to unlock the telephone using a three-digit unlock code, and to enter a six-digit security code.

Upon recognition of the word "Clear" any display will be erased from the handset screen. This command is used to correct an entry mistake.

Upon recognition of the word "Send" the telephone number just entered or retrieved from memory will be dialed automatically by the cellular phone 21.

Upon recognition of the word "End" the call will be terminated and the system reverts to an idle state.

Upon recognition of the word "Recall" the phone number previously dialed, even if the telephone has been turned off, will be displayed. The user then prompts the system with "Send" to dial the phone. If the user prompts the system with "Recall" and then the two-digit telephone memory location, that phone number will appear in the handset display.

To commit a phone number to the telephone memory (01-30), a user speaks a series of digits (as in a telephone number) then speaks the word "Store" then speaks the two telephone memory storage digits such as "One," "Two", for storage location twelve. This feature is used for storing telephone numbers and for setting security levels. This command also stores the new listing for reassignments. Upon recognition of the word "Menu" the module sequentially elicits the words: "Lock", "End", "Listing", "Clear", "Send", "Recall", "Store", "Reassign", "Menu" and "Abort". Pronunciation of the two words "Listing" followed by "Menu" will elicit the words "listing one through nine", "Menu", "Abort", and "Reassign".

In addition to the prompts "phone" and "lights", the system 10 responds to a number of other second tier inputs after receipt of the car name command. These other commands are listed in Table 4. Those commands designated with an asterick (*) utilize the CRT 27 to initiate control functions so that the CRT 27 and voice control circuit 40 work together in maintaining vehicle control.

TABLE 4

| Car Name |
|---|
| abort |
| menu |
| Phone |
| Retrain |
| Door |
| Wipers |
| Lights |
| Trunk |
| Cruise |

TABLE 4-continued

| |
|---|
| Defog |
| Window |
| Radio* |
| Climate* |
| Trip-Monitor* |
| Summary* |
| Metric* |
| Defrost* |

The control circuit 40 has a manual pushbutton 300 (FIG. 2B) to override the recognition circuit 70. Actuating this pushbutton is equivalent to speaking the car name. By actuating the button the operator can then articulate one of the Table 4 commands to work his or her way through the hierarchal command structure.

The special communications microprocessor 310 is illustrated more particularly in FIG. 6. Interposed between the microprocessor 310 and the control microprocessor 260 (FIG. 2A) is a peripheral interface adapter 312. This adapter 312 performs two functions within the control circuit 40 only of which is related to the communications microprocessor 310. A first output 314 from the adapter 312 is coupled to the audio output circuit 282 in FIG. 2A. The eight bit digital information on this output 314 controls the gain of the audio amplifiers coupled to the radio speakers 26a. A second digital output 316 from the peripheral interface adapter 312 supplies eight bits of data for the microprocessor 310.

The communications processor 310 is a dedicated microprocessor with its own two kilobyte operating system stored internally. It is specifically designed for communications. Control signals from the microprocessor 260 for reading, writing and resetting the communications processor 310 also pass through the peripheral interface adapter 312. The microprocessor 310 generates and monitors signals to and from the cellular telephone along three transmission lines 320, 322, 324. The state of these three transmission lines is both monitored and controlled by the communications processor 310. The particular protocols for controlling the phone will depend upon the particular cellular telephone being utilized in the control system. Briefly, one of lines 324 is for data transmission, and the two other lines 320, 322 are for transmission of control signals from the telephone. A third serial transmission path 326 whose status is controlled by the microprocessor 310 transmits data to the cathode ray tube 27. By appropriate control of this transmission path 326, the CRT display is controlled so that menus and the like can be presented to the user for control of those commands having an asterisk in Table 4. The data carrying status of the paths 324, 326 is controlled by switching transistors 330, 332 having base inputs coupled to the microprocessor 310.

As noted in the background art discussion above, other control microprocessors are used in vehicle control. In one system the control microprocessor 260 communicates with a master controller via a serial data path 305. Communications on this path 305 can cause the microprocessor 260 to initiate speech in response to a situation sensed or determined by the master controller. Alternate voice control systems similar to the disclosed system are possible. It is the intent, however, that the invention include all modifications and alterations from the disclosed design falling within the spirit or scope of the appended claims.

We claim:

1. A voice actuated system for controlling motor vehicle operations comprising:
   a microphone mounted to the vehicle for converting speech from a vehicle operator into input signals representative of an operator enunciated command;
   controller means for monitoring said input signals from the microphone, said controller means including a memory interface for accessing pre-recorded voice profile signals and comparing said pre-recorded voice profile signals with the input signals from the microphone,
   an interchangeable memory module that can be coupled to the memory interface of the controller means for storing pre-recorded voice profile signals that are unique for a specific vehicle operator and that maintain said pre-recorded voice profile signals in memory whether or not the memory module is coupled to the memory interface; said memory module including a pre-recorded data representation of an operator pronunciation of one or more motor vehicle control commands, and
   interface means responsive to control outputs from the controller means for activating one or more vehicle control operations in response to sensing of a correspondence between the input signal representation of the operator enunciated command and voice profile signals.

2. The voice actuated system of claim 1 wherein the memory module includes a battery backup to maintain said pre-recorded voice profile signals.

3. The voice actuated system of claim 1 wherein the controller means includes means for storing the voice profile signals in the interchangeable memory module.

4. A method for controlling a motor vehicle comprising the steps of:
   sensing an operator's voice command;
   converting the voice command into a sequence of voice signals;
   comparing the sequence of voice signals with a plurality of command characterizing signals stored in a command storage unit and organizing the command characterizing signals into a hierarchal ordering of commands where the ordering is organized into levels of general high level command and more specific lower level commands;
   determining a closest match between the voice signals and the command characterizing signals to determine what command is spoken by the operator; and
   executing an appropriate command or waiting for the operator to enunciate an appropriate command sequence if the spoken command sequence was inappropriate to reach a level in the hierarchal ordering of commands where an action is appropriate.

* * * * *